Figure 1:
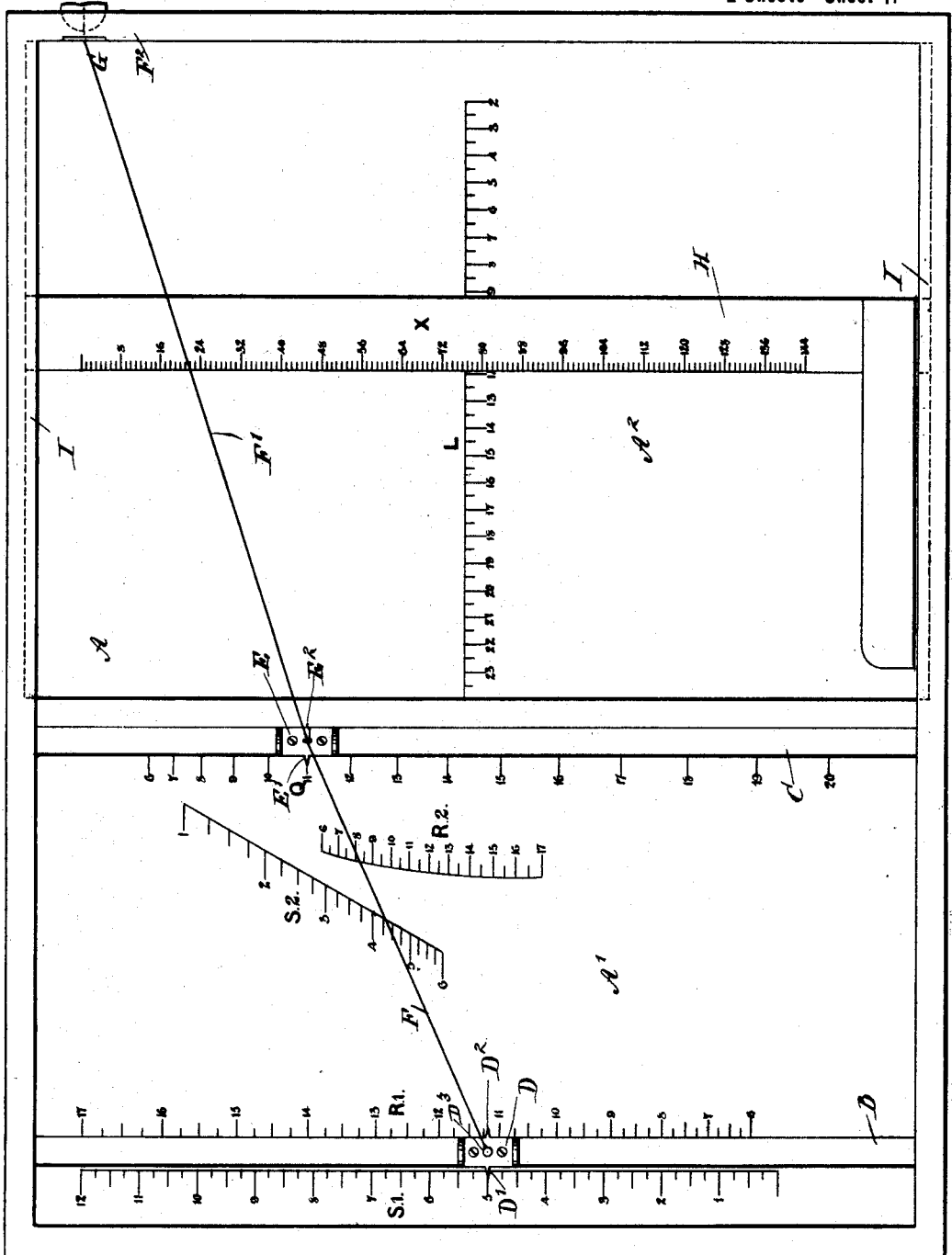

No. 666,091. Patented Jan. 15, 1901.
F. D. FERGUSSON.
CALCULATOR.
(Application filed Dec. 29, 1897. Renewed June 7, 1900.)

(No Model.) 2 Sheets—Sheet 1.

WITNESSES: Edward Thorpe.

INVENTOR
F. D. Fergusson
BY
ATTORNEYS.

No. 666,091. Patented Jan. 15, 1901.
F. D. FERGUSSON.
CALCULATOR.
(Application filed Dec. 29, 1897. Renewed June 7, 1900.)
(No Model.) 2 Sheets—Sheet 2.
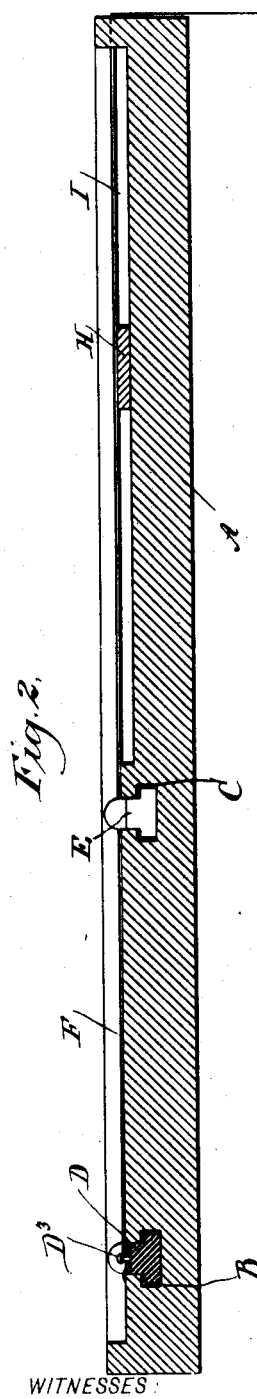
WITNESSES:
Edward Thorpe.
Geo. J. Hooker
INVENTOR
F. D. Fergusson
BY
ATTORNEYS.

UNITED STATES PATENT OFFICE.

FREDERICK DUNCAN FERGUSSON, OF PAEROA, NEW ZEALAND.

CALCULATOR.

SPECIFICATION forming part of Letters Patent No. 666,091, dated January 15, 1901.

Application filed December 29, 1897. Renewed June 7, 1900. Serial No. 19,491. (No model.)

*To all whom it may concern:*

Be it known that I, FREDERICK DUNCAN FERGUSSON, a subject of the Queen of Great Britain, residing at Paeroa, Auckland, New Zealand, have invented a new and Improved Calculator, of which the following is a full, clear, and exact description.

The object of the invention is to provide a new and improved calculator which is simple and durable in construction, easily manipulated, and more especially designed for quickly and conveniently calculating timber, earth quantities, interest, &c.

The invention consists, principally, of carriers or blocks movable in parallel guideways, a connection between the two blocks, and a scale or scales between the said guideways and on which reads the connection.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a plan view of the improvement. Fig. 2 is a sectional side elevation of the same, and Fig. 3 is a face view of a table used in connection with the device.

The improved calculator is preferably mounted on a suitably-constructed board or table A, formed on its face with parallel guideways B and C, placed a suitable distance apart to leave a space A' between the said guideways, and a second space $A^2$ adjacent to the guideway C on the top of the table or board A. The space A' is used for scales or graduations $R^2$ and $S^2$, and the space $A^2$ is formed with a scale or graduation L, indicating linear measurement.

On the sides of the guideway B are arranged scales or graduations S' and R', and on one side of the guideway C is arranged a graduation Q.

In the guideways B and C are fitted to slide the carriers or blocks D and E, respectively, of which the carrier D is provided with pointers D' $D^2$ for indicating on the graduations S' and R', respectively, and a similar pointer E' is on the carrier E for indicating on the graduation Q.

On the top of the carrier D is arranged a pin $D^3$, engaged by a loop on one end of a string or cord F, extending across the space A' to pass loosely through an eye $E^2$, formed on the carrier E, the cord then extending, with the portion F', over the space $A^2$ to finally pass through an aperture in a guide-plate G and through the wall of the table to the outside thereof to carry at this end a weight $F^2$ for holding the cord or string taut on the top of the table.

A graduated bar H, containing the result sought, has its ends fitted to slide in suitable guideways I, arranged on the table A. This bar moves along the graduation L, and its left-hand edge (see Fig. 1) indicates thereon. A graduation X on said bar is read by the part F' on the cord F as the latter extends over the space $A^2$.

Now it is evident that the carriers D and E when shifted in their respective guideways shift the cord F accordingly, so that the said cord indicates on different points on the graduations $S^2$, $R^2$, and X. Now the graduation L, with the movable bar H and the graduation X, constitutes a proportion-scale in the form of a right-angled triangle, of which the aperture in the plate G is the apex and the guideway C, the part F' of the cord F the hypotenuse, and a line extending through the aperture in the plate G and parallel to the side of the table the altitude. The aperture in plate G, zero on the scale X, and the maximum readings—namely, 12 and 17 on scales S' and R'—must be in the same straight line. The graduation $S^2$ is along a line indicated by the cord F when the block D' stands at zero on scale S', with the carrier E placed so that the part F' of the cord F intersects zero on scale X. The graduations R' and $R^2$ are specially formed for calculating quantities of earthwork, as in road or railway cuttings.

Now in order to use the device, say, for instance, for finding the number of superficial feet in any number of similar boards, the length, width, and thickness of one board being given, the operator first finds from the table shown in Fig. 3 the number of running feet and then moves the bar H along its guideways I until the graduated edge of the said bar indicates on the graduation L the number derived from the said table. (Shown in Fig. 3.) The operator now moves the carrier D until the pointer D' indicates the width of the board in inches on the scale S', and then the operator moves the other carrier E until the cord F crosses the graduation or scale $S^2$ at the point indicating the thickness of the board in inches. The result is now read by the string or cord part F' on the graduation X at the intersection of the said cord with the graduation. The scale X must be read the same as the scale or graduation L. For example, if the bar H indicates at "18.70" on the graduation L to stand for eighteen hundred and seventy running feet then the cord crossing the scale X at "45.40" means four thousand five hundred and forty superficial feet.

When it is desired to find the actual number of superficial feet in a round log, the circumference of which is given, then the operator proceeds as follows: The bar H is set on the graduation or scale L to the length of the log in feet, the said scale being read as units. The carrier D is then adjusted in the guideway B until the pointer $D^2$ indicates on the graduation R' the circumference of the large end of the log in feet and inches, and then the other carrier E is adjusted until the cord F crosses the scale $R^2$ at the point indicating the circumference of the small end of the log, likewise in feet and inches. The result is read at the intersection of the cord on the graduation X of the bar H as the said cord crosses the bar H at the required number of superficial feet.

To find the actual number of cubic feet in a round log when the circumference of each end is known, then the operator first proceeds as above described in reference to finding the number of superficial feet, and then the result is divided by twelve.

When it is desired to find the number of superficial feet that can be sawed or cut from a round log after allowing for waste in slabs, &c., during the cutting, the operator first sets the bar H to the length of the log in feet on the scale L, reading the latter as units, and then moves the other carrier E to indicate with its pointer the mean circumference in feet and inches of the log on the scale Q. The result is now read on the graduation X at the intersection of the cord F on the said scale. Divisions 12 and 17 on the guideway B, zero on scale X, and the aperture in guideplate G must be in one and the same straight line to form one side of a triangle having as the hypotenuse the cord F. In the arrangement shown I took twenty-four feet as a convenient maximum length for scale L, twelve inches as a convenient maximum length for scale S', and six inches as a convenient maximum length for scale $S^2$. This gives as a result one hundred and forty-four superficial feet as maximum result. Scale X, scales S' and X were then arbitrarily fixed and evenly divided, occupying the width of the board or table. I then made a table of results showing the number of superficial feet in a board twenty-four feet long which was twelve by one, twelve by two, twelve by three, &c., eleven by one, eleven by two, &c., and so on. I then set H at "24" on scale L. Now take an example: To find the position of division 2 on scale $S^2$, a twenty-four-foot board twelve by two contains forty-eight superficial feet, a twenty-four-foot board eight by two contains thirty-two superficial feet. Set the bar H at "24" on the scale L and set the carrier D at "12" on the scale S'. Now move the other carrier E until the thread or cord F crosses the result forty-eight on the scale X and draw a line across the space A', marking the position of the cord or thread. Then set the carrier D at "8" on the scale S' and move the carrier E until the cord or thread crosses the result thirty-two on scale X and draw another line as before. The intersection of these lines will give the position of "2" on scale $S^2$, and so on. The subdivisions may be found this way or by geometrical construction. Scales R' and $R^2$ are similarly found.

It is evident that from the foregoing the device can be readily used for various other purposes besides the ones mentioned, and it is further evident that additional and different scales may be employed for certain calculations, the said scales being located, however, in the space between the guideways B and C and with a proportion-scale adjacent to the guideway C.

Having thus fully described my invention, I claim as new and desire to secure by Letters Patent—

1. A calculator, provided with carriers movable in parallel guideways, scales disposed along said guideways and on which scales the carriers read, a connection between the two carriers, a scale or scales between the said guideways, the connection being movable over the scale or scales to indicate thereon, and a proportion-scale adjacent to one of the guideways, and on which indicates an extension of the said connection, substantially as shown and described.

2. A calculator comprising a table formed with parallel guideways, carriers fitted to slide in the said guideways, scales disposed along said guideways and on which scales the carriers read, additional scales arranged on the table between the said guideways, a flexible connection between the said carriers, a proportion-scale arranged at one side of the carrier, and formed by a fixed scale indicating linear measurement, a movable bar having a resultant graduation, and a connection extending from one of the said carriers over the said proportion-scale, for indicating on the bar, substantially as shown and described.

3. A calculator, provided with a table, two carriers movable thereon, a scale or scales on the table and situated between the carriers, a flexible connection extending between the carriers and engaged at one end with the table, a bar with a scale thereon, and a scale formed on the table adjacent to the bar, the bar being adjustable on the table with respect to the last-named scale and the flexible connection reading on the bar and on the said scale or scales which are located between the carriers.

FREDERICK DUNCAN FERGUSSON.

Witnesses:
   J. P. MEAGHER,
   J. M. WEAGLE.